(12) United States Patent
Baldwin et al.

(10) Patent No.: US 6,736,588 B1
(45) Date of Patent: May 18, 2004

(54) INTEGRATED LARGE GLASS HANDLING SYSTEM

(75) Inventors: David L. Baldwin, Atascadero, CA (US); Steven Keith, San Jose, CA (US)

(73) Assignee: Photon Dynamics, Inc., San Jose, CA (US)

( * ) Notice: Subject to any disclaimer, the term of this patent is extended or adjusted under 35 U.S.C. 154(b) by 0 days.

(21) Appl. No.: 10/435,323

(22) Filed: May 9, 2003

(51) Int. Cl.[7] .............................................. B65G 35/00
(52) U.S. Cl. .......................................... 414/676; 406/88
(58) Field of Search .............................. 414/676; 406/88

(56) References Cited

U.S. PATENT DOCUMENTS 3,473,910 A * 10/1969 Wilde et al. ............... 65/182.2
6,336,775 B1 * 1/2002 Morita et al. ................. 406/88
6,354,789 B2 * 3/2002 Takeuchi et al. ............ 414/676

* cited by examiner

*Primary Examiner*—Joe Dillon, Jr.
(74) *Attorney, Agent, or Firm*—Townsend and Townsend and Crew LLP; Kenneth R. Allen

(57) ABSTRACT

A mechanical system for handling large and thin glass plates of dimensions as much as 2 m by 2 m by 0.5 mm, such as used to manufacture LCD panels in LCD panel testers, provides for positioning of the repair and inspection equipment by using lightweight hollow chucklets in air-bearing and vacuum contact with the glass plate under test, balanced on a rail along the center of mass for translation without warping. The elimination of a heavy rigid platform results in significantly reduced hardware costs, flexibility in processing and improved positioning performance.

4 Claims, 2 Drawing Sheets

INTEGRATED LARGE GLASS HANDLING SYSTEM

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

This invention relates to glass handling and positioning for large LCD plates during inspection and repair. The invention has particular application to equipment manufactured by Photon Dynamics, Inc. of San Jose, Calif. and currently marketed as the "Array Saver" and the "Array Checker." However, the application is not limited to those systems. Glass handling systems have been manufactured for larger LCD panels, but they are not configured and optimized specifically to meet the requirements of the mounted test and repair hardware.

Conventional panel glass handling systems have been constructed from generally available sub-system components. In order to meet the requirements of larger LCD panel dimensions, these components have been scaled up in size. This increase in sub-system component size, without regard to specific functionality, has resulted in performance limitations and costly glass handling system expenses. What is needed is a mechanism for transporting large fragile plates with minimal risk of damage and maximum accuracy and processing speed.

SUMMARY OF THE INVENTION

According to the invention, as a part of a testing system, a handling system for servicing large fragile glass sheets or plates, such as those from which LCD panels are, manufactured, provides for positioning of the repair and inspection equipment by using lightweight chucklets attached through vacuum contact with the glass plate under test, which acts as part of the stage and eliminates need for a heavy rigid platform. This results in significantly reduced hardware costs, low inertial effects and yields improved positioning performance.

The invention will be better understood by reference to the following detailed description in connection with the accompanying drawings.

DETAILED DESCRIPTION OF THE INVENTION

Figure 1:
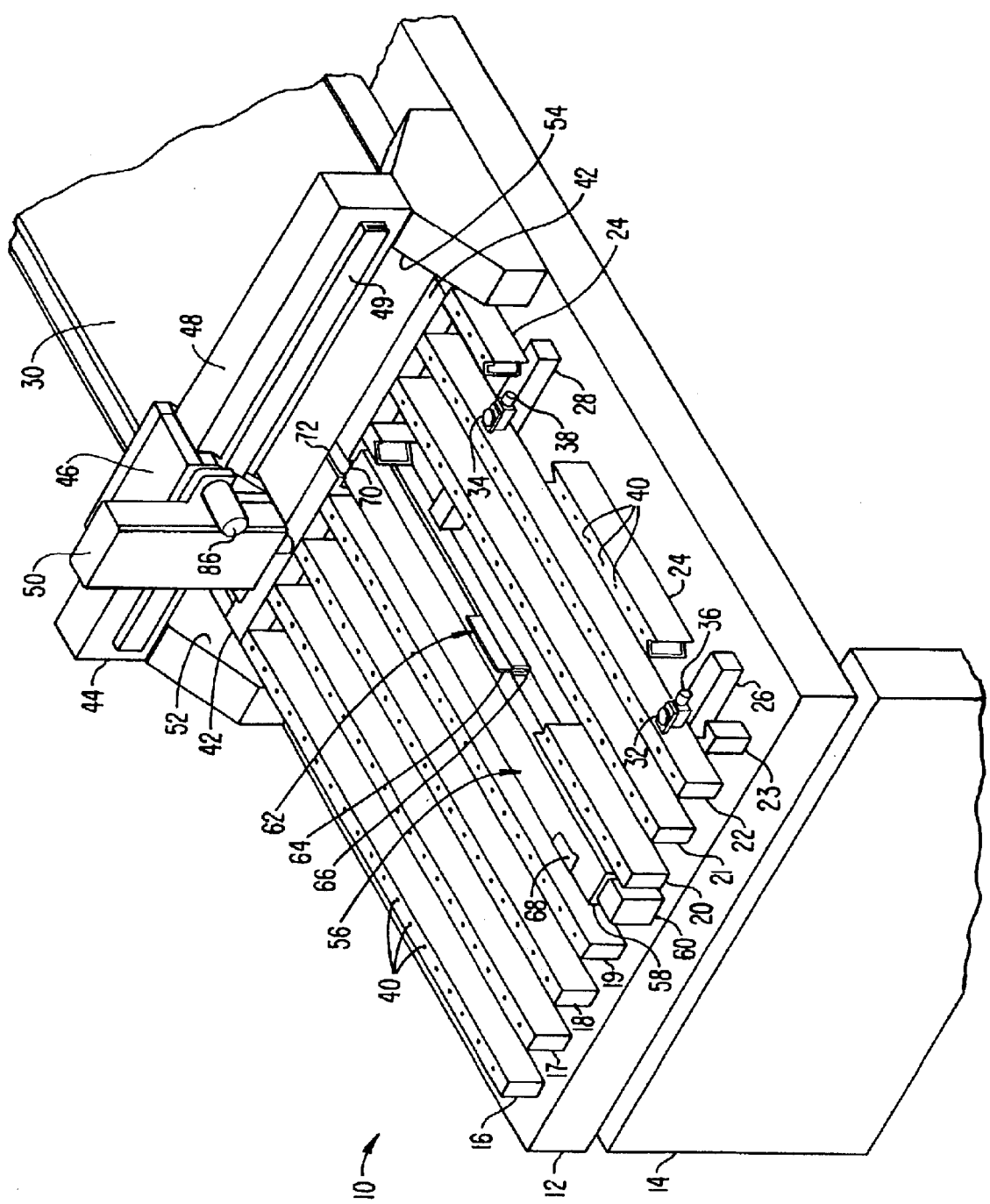
FIG. 1 is a perspective view of a specific embodiment according to the invention.
Figure 2:
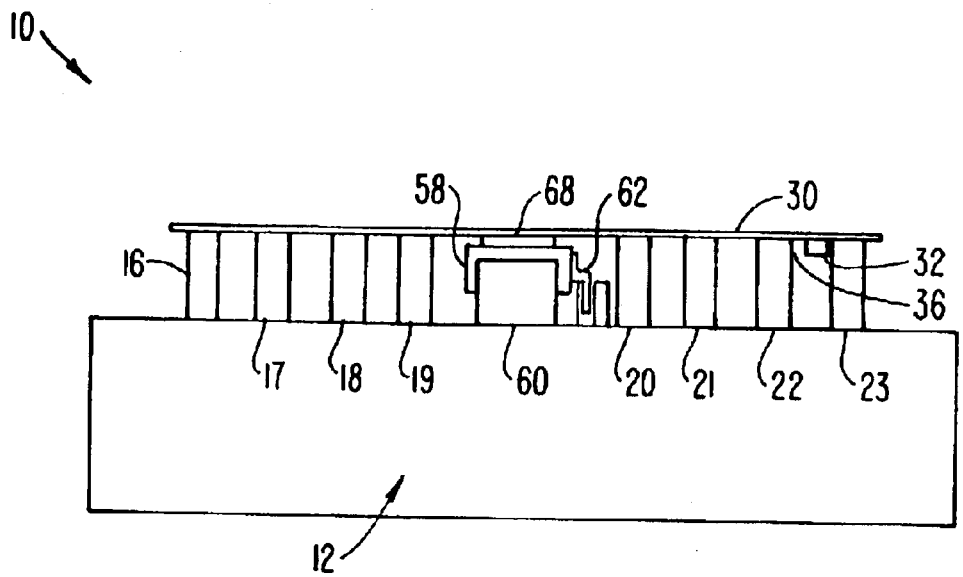
FIG. 2 is a side cross-sectional view of the embodiment of FIG. 1.

Referring to FIGS. 1 and 2, a glass handling platform 10 according to the invention comprises a base plate 12 rigidly mounted on a supporting structure 14 and having on the top an array of parallel rails, herein chucklets 16–23 that are typically hollow and are precisely aligned to support a flat large thin sheet of glass, herein a customer plate 30. The chucklets 16–23 rest on cross braces 26, 28. The second end chucklet 24 is shown in cutaway to illustrate vacuum clamps 32, 34 which are mounted on rotation and alignment slides 36, 38. A similar arrangement can be provided at the first end chucklet 16. Edge sensors (not shown) are used to detect the edge of an overlying customer plate 30. The chucklets 15–23 employ air bearings (such as perforations 40 in the face confronting the underside of the customer plate 30) and are coupled at one end into a transverse vacuum plenum 42, thereby forming a grill for supporting, the customer-supplied plate 30 to be tested.

Each degree of freedom, X (across the rails), Y (along the rails), and Z (up and down) has a different control mechanism. The X-axis stage 44 is a conventional air bearing stage that is driven by a linear motor 49 that moves a platform 46 along a rail 48 along X-axis, transporting a head 50 mounted on the platform 46 by non-gripping contact with the rail 48 between large end pads 52, 54 attached to the rail 48. This mechanism is not radically different than many existing stages.

According to the invention, the Y-axis-axis transport mechanism is a sliding mechanism optimized using a unique mechanical configuration that interacts with the unit under test to minimize mass and ease alignment. The only mass moved in the Y-axis is the customer plate 20 employed as the surface of a Y stage 56, thus substantially reducing the Y-stage moving mass. The Y-stage 56 is a lightweight slotted beam 58 conforming to a rail 60 which is an air bearing centered in the platform area between the center chucklets 19 and 20. The beam 58 is supported by the air bearing of rail 60 and is slidable along the rail 60. The beam 58 is attached to a linear motor 62 having a position encoder 64 and a slot 66 in which the encoder is slidable under control of a stepping controller (not shown).

Small vacuum clamps 68, 70 and so forth (not visible) along the center beam 58 are coupled to a controlled vacuum source (not shown) and serve to attach to the customer plate 30 underside to the beam 58 and to securely hold the customer plate 30 when in motion. The customer plate 30 is attached to the vacuum clamps 68, 70 along an axis through its center of mass that forceful Y-axis motion does not twist the plate in the X-Y plane. The Y-stage is operative to guide the customer plate 30 over the air bearings of the chucklets. The vacuum clamps such as clamps 32, 34 on the slides 36, 38 are used to hold, rotate and align the customer plate 30 when not in motion. FIG. 2 illustrates these features in side view. Only two vacuum clamps are needed, although vacuum clamps could be employed at opposing edges of the customer plate 30, as explained below.

Means 72 in the plenum 42 form a passage to allow translation of the vacuum clamp 70 through the region in the center of the plenum 42. A segment (not shown) of the plenum 42 above the clearance for the vacuum clamp may bridge the sections of the plenum.

This arrangement employs air bearings in the chucklets 16–23 in combination with vacuum restraints 32 and 34 and positioners 36 and 38 to accurately control and stabilize the panel's vertical location while it is positioned beneath the inspection or repair equipment. This chuck configuration also supports the use of a tilted mirror to facilitate true backlight illumination to the optical system, since adequate clearance for illumination is provided under the customer plate 30.

The vacuum retention feature solves the problem of driving warped panels over an air bearing structure by forcibly straightening the thin glass panel to conform to the flat air-bearing surface. The spaces between the chucklet bars 16–23 also allow room for a robot end effector to place the panel on the stage and thereafter retract.

Figure 3:
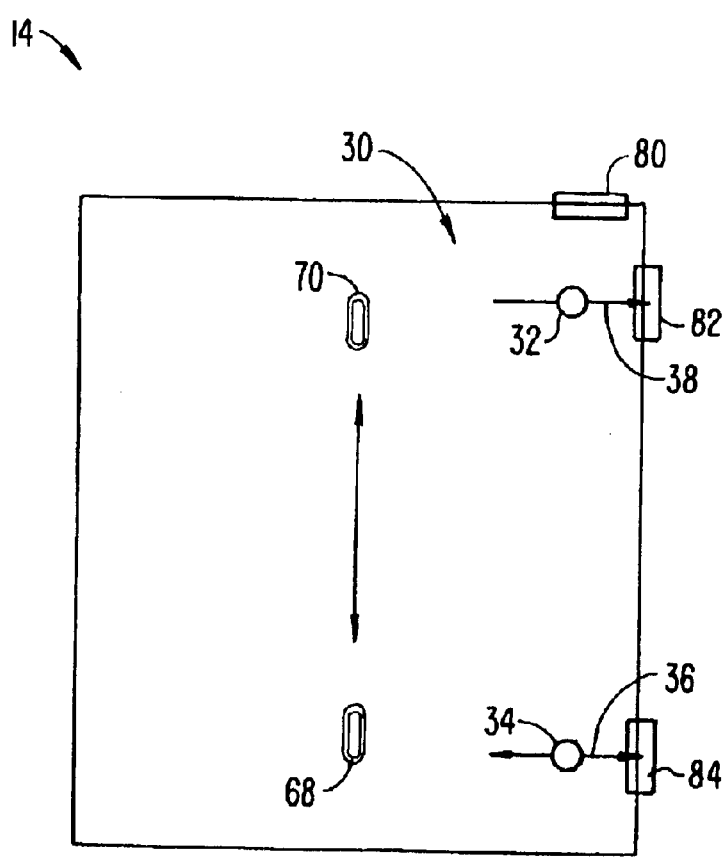
FIG. 3 is a top plan view of the embodiment of FIG. 1.

Referring to FIG. 3, alignment of the customer plate 30 is accomplished using glass edge sensors 80, 82, 84 along at least two edges to dynamically position the vacuum holding pads 32, 34 attached to the plate 30 and the slides 36, 38 in the x direction. Rotation of the glass to true orthogonal is thus accomplished without aid of potentially destructive banking devices. FIG. 3 illustrates this feature.

Panels of different sizes can float properly on the chucklets 15–23. Centering and alignment of different size panels is accomplished by locating the glass edge sensors at one-half panel distance from the driving y-stage center.

Z-Axis motion is required for selected inspection systems, but limited movement is contemplated. Flexors and mutating drives 86 (FIG. 1) are employed if system requirements do not require large z-axis movement. It has been found that this type of glass handling system is suitable to handle, without damage, plates as large as about 2 meters long on each side with a thickness as low as 0.5 mm.

The invention has been explained with reference to specific embodiments. Other embodiments will be evident to those of skill in the art. It is therefore not intended that this invention be limited, except as indicated by the appended claims.

What is claimed is:

1. A glass handling system for translating and supporting a large thin glass plate comprising:

a baseplate;

an array of rail chucklets coupled to said baseplate and disposed to confront said glass plate, each of said chucklets having perforations disposed to emit gas as air bearings impinging on said glass plate, said chucklets being arranged in parallel ranks, thereby forming a grill for receiving, supporting and securing, under vacuum contact, said glass plate;

vacuum pads mounted to slides for attaching to said glass plate for retention rotation alignment and limited translation alignment; and a Y-translation stage disposed to underlie the glass plate along an axis through its center of mass, said Y-translation stage including vacuum clamps for attaching to said glass plate.

2. The glass handling system according to claim 1 wherein said vacuum pads are disposed to confront said glass plate near its edges.

3. The glass handling system according to claim 1 further comprising a rail X translation stage mounted to said baseplate, a nutating Z translation stage mounted to said X-translation stage and wherein said Y-translation stage is on an air bearing.

4. The system according to claim 2 wherein said Y-translation stage is a rail on an air bearing and wherein a linear motor is mounted to said Y-translation stage for engaging said glass plate along its center of mass to minimize torque of movement.

* * * * *

UNITED STATES PATENT AND TRADEMARK OFFICE
CERTIFICATE OF CORRECTION

PATENT NO.        : 6,736,588 B1                                      Page 1 of 1
APPLICATION NO. : 10/435323
DATED              : May 18, 2004
INVENTOR(S)      : Baldwin et al.

It is certified that error appears in the above-identified patent and that said Letters Patent is hereby corrected as shown below:

IN THE DETAILED DESCRIPTION OF THE INVENTION

In column 2, line 9, please replace "the chucklets 15-23" with --the chucklets 16-23--
In column 3, line 16, please replace "the chucklets 15-23" with --the chucklets 16-23--

Signed and Sealed this

First Day of August, 2006

JON W. DUDAS
*Director of the United States Patent and Trademark Office*